United States Patent [19]

Sanada

[11] Patent Number: 5,446,608
[45] Date of Patent: Aug. 29, 1995

[54] MAGNETIC HEAD POSITIONER FOR A MAGNETIC DISK APPARATUS

[75] Inventor: Yotaro Sanada, Tokyo, Japan
[73] Assignee: NEC Corporation, Tokyo, Japan
[21] Appl. No.: 250,604
[22] Filed: May 27, 1994
[30] Foreign Application Priority Data
  May 27, 1993 [JP] Japan .................................. 5-148595
[51] Int. Cl.6 ............................................ G11B 33/14
[52] U.S. Cl. .................................. 360/97.02; 360/106
[58] Field of Search ............................. 360/97.02, 106
[56]     References Cited
         U.S. PATENT DOCUMENTS
  5,251,085 10/1993 Morris ........................... 360/98.01
  5,260,847 11/1993 Basehore ............................ 360/106

*Primary Examiner*—A. J. Heinz
*Attorney, Agent, or Firm*—Sughrue, Mion, Zinn, Macpeak & Seas

[57]     ABSTRACT

A magnetic head positioner for a magnetic disk apparatus has a shaft, which includes a material having a prescribed coefficient of linear expansion, and is supported so as to be stationary in the magnetic disk apparatus, may be made of a stainless steel-based material. Bearings are arranged along its axial direction at a prescribed distance and fastened to the outer peripheral surface of the shaft at the inner peripheral surfaces thereof. A cylindrical sleeve, which includes a material having a different coefficient of linear expansion from that of the shaft, is fastened to the outer peripheral surfaces of the bearings at the inner peripheral surface thereof and may be made of an aluminum-based material. A magnetic head holder is arranged on the outer peripheral surface of the cylindrical sleeve and provided with arms having magnetic heads. The arms, which are provided with the magnetic heads, protrude from an outer peripheral part of the magnetic head holder in a horizontal direction. A cylindrical correcting plate, which includes a material having a different coefficient of linear expansion from that of the shaft, is interposed in a prescribed part of the cylindrical sleeve and may be made of AlTiC or $Al_2O_3$. An area of the outer peripheral surface of the cylindrical sleeve excluding the upper and lower parts thereof is slightly reduced in diameter to form a gap at a prescribed area. The gap is formed to reduce contact areas between the cylindrical sleeve and the magnetic head holder.

5 Claims, 3 Drawing Sheets

MAGNETIC HEAD POSITIONER FOR A MAGNETIC DISK APPARATUS

BACKGROUND OF THE INVENTION

1. Field of the Invention

The present invention relates to a magnetic disk apparatus, and more particularly to a magnetic head positioner provided in a magnetic disk apparatus for reducing the thermal off-track of magnetic heads due to variations in ambient temperature.

2. Description of the related art

First will be described a conventional magnetic head positioner for a magnetic disk apparatus with reference to FIGS. 4 and 5.

FIG. 4 is a cross-sectional view of the conventional magnetic head positioner, and FIG. 5 is a graph representing experimental data of the thermal off-track of the conventional magnetic head positioner, obtained using a prescribed ambient temperature T in the magnetic disk apparatus.

In general, the conventional magnetic head positioner of the rotary actuator type has a configuration in which two sets of bearings are fastened between a shaft and sleeve, and support rotatable arms provided with magnetic heads.

Referring to FIG. 4, the conventional magnetic head positioner has a shaft 31, two sets of bearings 32, a cylindrical sleeve 33, a magnetic head holder 34, magnetic heads 35, and arms 36.

The shaft 31, which includes a stainless steel-based material, is arranged to be stationary in the magnetic disk apparatus and functions as the center axis of rotational movement of magnetic heads 35.

The two sets of bearings 32 are arranged along their axial directions at prescribed distances on the outer peripheral side of the shaft 31.

The cylindrical sleeve 33, which includes an aluminum-based material, is fastened to the outer peripheral side of the bearings 32.

The magnetic head holder 34 is mounted on the outer peripheral side of the cylindrical sleeve 33.

The arms 36 protrude from the outer peripheral side of the magnetic head holder 34 in a horizontal direction and each arm 36 is provided with a pair of magnetic heads 35 at one end thereof. The pair of magnetic heads 35 interpose a magnetic disk 37 therebetween, respectively.

Referring to FIG. 5, the horizontal axis of the graph shows the amount of the thermal off-track at the ambient temperature T, and the vertical axis of the graph shows the disk number of the magnetic disks 37 in order from below.

According to FIG. 5, the average amount of the thermal off-track of the pair of magnetic heads 35 corresponding to each magnetic disk 37 at the ambient temperature T is approximately +2.0 μm.

The above-described conventional magnetic head positioner has a following disadvantage which prevents reducing of the thermal off-track. The conventional magnetic head positioner has a configuration in which an inner peripheral surface of the bearings 32 and an outer peripheral surface of the bearings 32 are fastened, respectively, to an outer peripheral side of the shaft 31 which includes the stainless steel-based material and an inner peripheral side of the cylindrical sleeve 33 which includes the aluminum-based material.

Therefore, since the expansion or contraction of the shaft 31 and the sleeve 33 in their axial direction differ when the ambient temperature in the magnetic disk apparatus varies, this difference in the amount of expansion or contraction causes abnormal pressure variations which operate on the bearings 32.

As a result of these abnormal pressure variations, it is impossible to minimize the thermal off-track of magnetic heads 35 and improve the reliability of the magnetic disk apparatus.

SUMMARY OF THE INVENTION

It is therefore an object of the present invention to eliminate the above-mentioned disadvantage and provide a magnetic head positioner for a magnetic disk apparatus capable of preventing the above-mentioned abnormal pressure variations due to the differences in the thermal expansion/contraction characteristics of the shaft and the sleeve, thereby reducing the thermal off-track of magnetic heads resulting from variations in ambient temperature, and improving the reliability of the magnetic disk apparatus.

According to the present invention, a magnetic head positioner for a magnetic disk apparatus has:

- a shaft mounted on an inner peripheral side of bearings, and comprising a material with a prescribed coefficient of linear expansion;
- a sleeve mounted on an outer peripheral side of the bearings, forming a gap in a prescribed area at an outer peripheral side thereof, and comprising a material with a different coefficient of linear expansion from that of the shaft;
- a magnetic head holder mounted on an outer peripheral side of the sleeve and provided with magnetic heads; and
- a correcting plate, interposed in one area of the sleeve, and comprising a material having a different coefficient of linear expansion from the shaft.

BRIEF DESCRIPTION OF THE DRAWINGS

The above objects and features of this invention will become more apparent from the following detailed description when taken in conjunction with the attached drawings.

DESCRIPTION OF THE PREFERRED EMBODIMENT

Next will be described an embodiment of the present invention with reference to FIGS. 1, 2, 3A and 3B.

Figure 1:
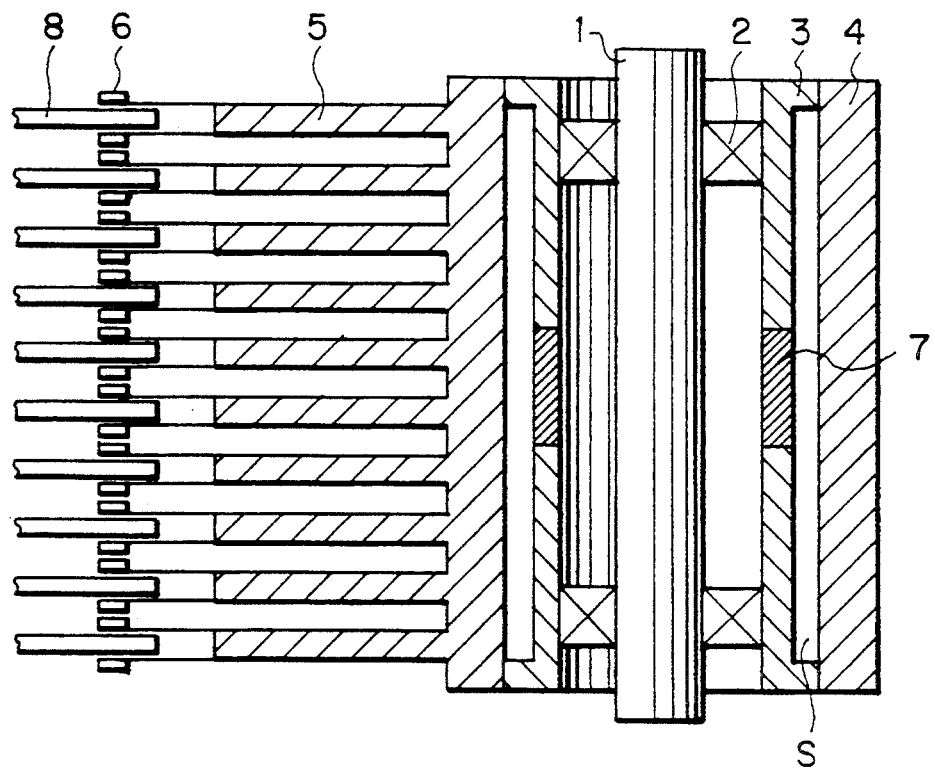
FIG. 1 is a cross-sectional view of an embodiment of a magnetic head positioner according to the present invention.

Referring to FIG. 1, a magnetic head positioner of an embodiment of the present invention has a shaft 1, which includes a material having a prescribed coefficient of linear expansion, and is supported so as to be stationary in the magnetic disk apparatus. The shaft 1 may be made of a stainless steel-based material.

Bearings 2 are arranged along its axial direction at a prescribed distance and fastened to the outer peripheral surface of the shaft 1 at the inner peripheral surfaces thereof.

A cylindrical sleeve 3, which includes a material having a different coefficient of linear expansion from that of the shaft 1, is fastened to the outer peripheral surfaces of the bearings 2 at the inner peripheral surface thereof. The cylindrical sleeve 3 may be made of an aluminum-based material.

A magnetic head holder 4 is arranged on the outer peripheral surface of the cylindrical sleeve 3. The magnetic head holder 4 is provided with arms 5 having magnetic heads 6.

The arms 5 protrude from an outer peripheral part of the magnetic head holder 4 in a horizontal direction and each arm 5 is provided with a pair of magnetic heads 6 at one end thereof. The pair of magnetic heads 6 interpose a magnetic disk 8 therebetween, respectively.

A cylindrical correcting plate 7, which includes a material having a different coefficient of linear expansion from that of the shaft 1, is interposed in a prescribed part of the cylindrical sleeve 3. Its coefficient of linear expansion is preferably smaller than that of the shaft 1. For example, the cylindrical correcting plate 7 may be AlTiC or $Al_2O_3$. The coefficient of linear expansion of stainless steel, aluminum, AlTiC, and $Al_2O_3$ at ambient temperature 0° through 100° C. are approximately $17.3*10^{-6}[1/° C.]$, $23.6*10^{-6}[1/° C.]$, $7.85*10^{-6}[1/° C.]$, and $7.1*10^{-6}[1/° C.]$, respectively. The length of the cylindrical correcting plate 7 in the axial direction is simply estimated on the basis of the length of shaft 1 in the axial direction along the bearings 2.

An area of the outer peripheral surface of the cylindrical sleeve 3 excluding the upper and lower parts thereof is slightly reduced in diameter to form a gap S at a prescribed area. The gap S is formed to reduce contact areas between the cylindrical sleeve 3 and the magnetic head holder 4.

Therefore, it is possible to prevent the deformation or displacement of the magnetic head holder 4 due to a variation in ambient temperature and at the same time reduce the thermal off-track of magnetic heads 6.

As the method to interpose the cylindrical correcting plate 7 in the cylindrical sleeve 3, it is conceivable to replace one part of the cylindrical sleeve 3 with the cylindrical correcting plate 7 as shown in FIG. 1, or to fit the cylindrical correcting plate 7 from both sides of the cylindrical sleeve 3.

Figure 2:
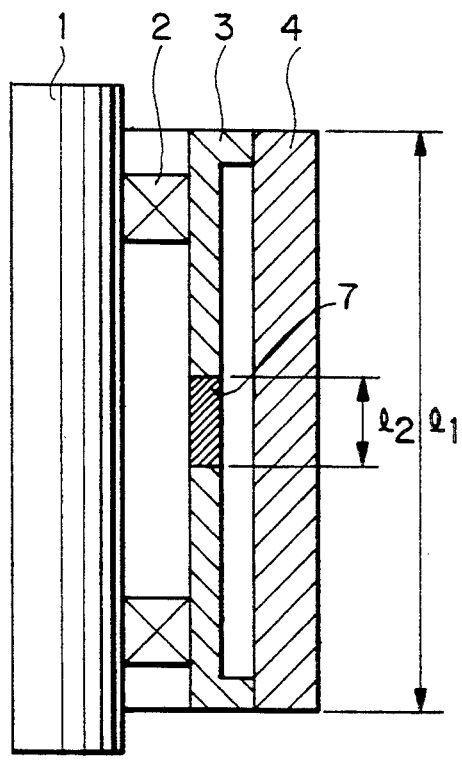
FIG. 2 is a expanded fragmentary sectional view of Fig. 1 to better describe the estimation of the length of a correcting plate in an axial direction seen in FIG. 1 according to the present invention.

Next will be described the estimation of the length of the correcting plate 7 in the axial direction with reference to FIG. 2, where $l_1$ shows the length of the shaft 1 in the axial direction about the bearings 2, and $l_2$ shows the length of the correcting plate 7.

In general, a thermal linear expansion may be briefly defined by the following equation.

$$L_t = L_0 * (1 + \alpha * T) \quad (1),$$

where $L_0$ shows the length of a certain material at ambient temperature 0° C., $L_t$ shows the length of the same material at ambient temperature T° C., and $\alpha$ shows the coefficient of thermal linear expansion of the same material. In this case, it is required as the necessary and sufficient condition that the length of the shaft 1 is substantially equivalent to the sum of the length of the sleeve 3 and the correcting plate 7 both before and after temperature variations to prevent the abnormal pressure variations from operating on the bearings 2 due to the differences in the thermal expansion or contraction characteristics of the shaft 1 and the sleeve 3. For example, assuming that the length $l_1$ of the shaft 1 at ambient temperature 0° C. is 10 cm, the length $l_2$ of the correcting plate 7 as AlTiC at ambient temperature 50° C. is estimated about 4.00 cm, and similarly, the length $l_2$ of the correcting plate 7 as $Al_2O_3$ at ambient temperature 50° C. is estimated about 3.82 cm by using the equation (1).

When the ambient temperature varies, the shaft 1 and the cylindrical sleeve 3 differ in their respective expansion or contraction characteristics because they are made of different materials. In this case, since the inner peripheral surface of the bearings 2 is fastened to the outer peripheral surface of the shaft 1 and the outer peripheral surface of the bearings 2 is fastened to the inner peripheral surface of the sleeve 3, this difference in the expansion or contraction causes abnormal pressures to act on the bearings 2 or to deprive the bearings 2 of a certain necessary pressure.

At this time, the shaft 1 expands or contracts in the axial direction at ambient temperature T by a prescribed amount based on the coefficient of linear expansion of the material, e.g., stainless steel. Similarly, the cylindrical sleeve 3 except the portion of the cylindrical correcting plate 7 expands or contracts in the axial direction at ambient temperature T by a prescribed amount based on the coefficient of linear expansion of the material, e.g., aluminum.

On the other hand, the cylindrical correcting plate 7 expands or contracts in the same axial direction at the same ambient temperature T by a prescribed amount based on the coefficient of linear expansion of the material, e.g., AlTiC or $Al_2O_3$ so as to reduce the difference in the amount of the expansion or contraction between the shaft 1 and the cylindrical sleeve 3 in the same axial direction to about zero. This means that the sum of the length of the sleeve 3 and the correcting plate 7 in the axial direction at the ambient temperature T can be substantially equivalent to the length of the shaft 1 in the axial direction about the bearings 2 at the same ambient temperature T both before and after temperature variations due to the correcting plate 7 having an appropriate length in the axial direction.

Therefore, it is possible to compensate for the difference in the coefficient of the linear expansion between the shaft 1 and the cylindrical sleeve 3, and thereby prevent the deforming force from operating on the magnetic head holder 4, which is provided with arms 5 having the magnetic heads 6.

Figure 3A:
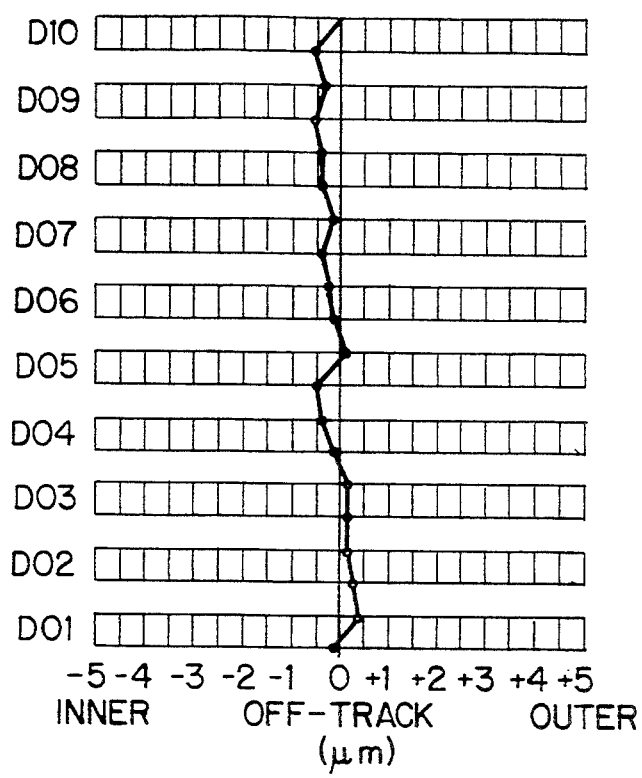
FIG. 3A is a graph representing experimental data of the thermal off-track of the magnetic head positioner of the present invention at a prescribed ambient temperature T.

FIG. 3A shows the case where the cylindrical correcting plate 7 is $Al_2O_3$. The horizontal axis and the vertical axis in FIG. 3A show the thermal off-track at the ambient temperature T and the disk number of the magnetic disks 8 in order from below, respectively.

Figure 3B:
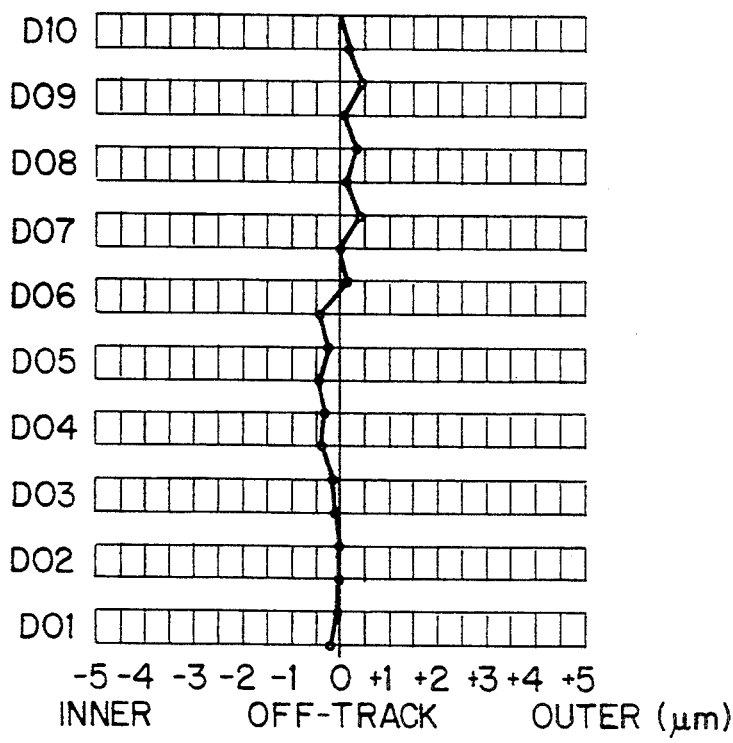
FIG. 3B is another graph representing experimental data of the thermal off-track of the magnetic head positioner of the present invention at the same ambient temperature T.
Figure 4:
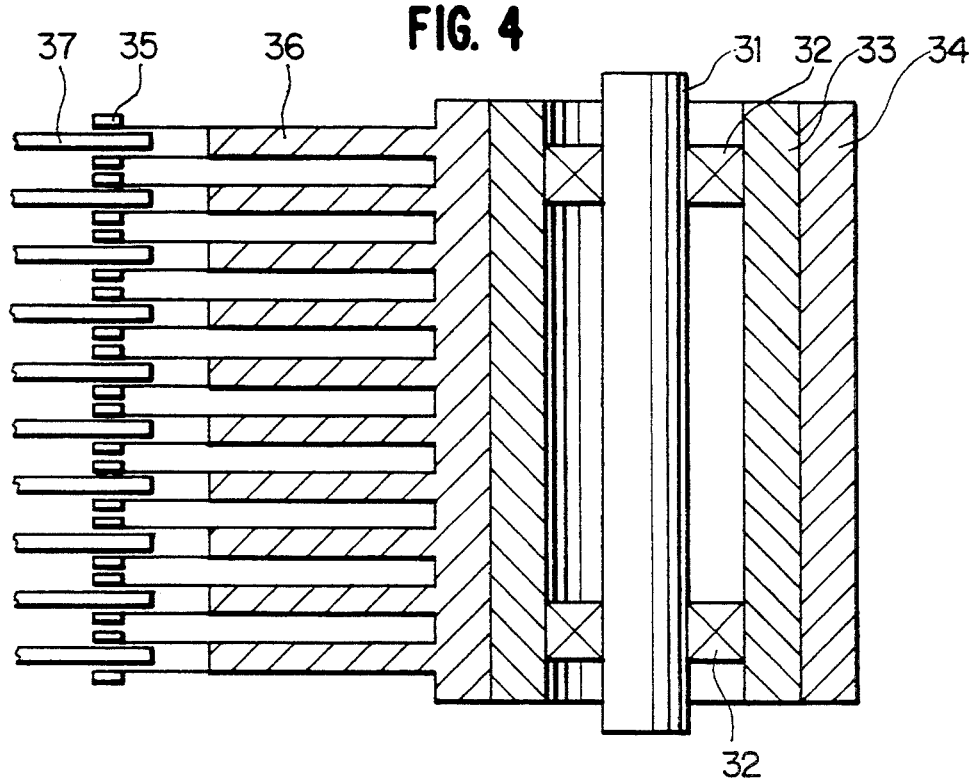
FIG. 4 is a cross-sectional view of a conventional magnetic head positioner related to the present invention.
Figure 5:
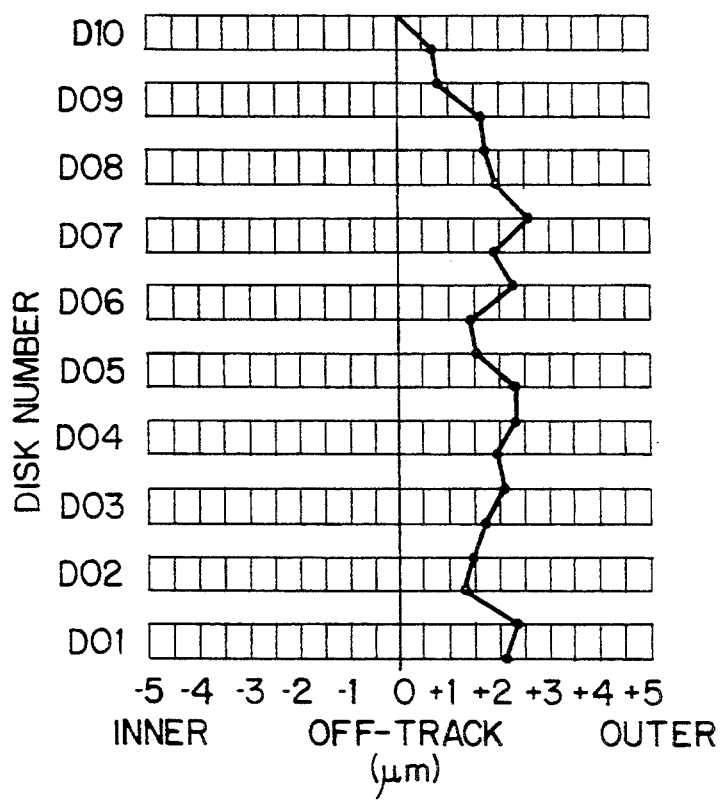
FIG. 5 is a graph representing experimental data of the thermal off-track of the conventional magnetic head positioner related to the present invention at the same ambient temperature T.

Similarly, FIG. 3B shows the case where the cylindrical correcting plate 7 is AlTiC. The horizontal axis and the vertical axis in FIG. 3B show the thermal off-track at the same ambient temperature T and the disk number of the magnetic disks 8 in order from below, respectively.

According to FIGS. 3A and 3B, the average amount of the thermal off-track of the pair of the magnetic heads 6 corresponding to each magnetic disk 8 at the same ambient temperature T are approximately $-0.2$ $\mu m$ and $-0.1$ $\mu m$, respectively.

Therefore, according to the present invention, it is possible to prevent abnormal pressure variations due to the difference in the expansion or contraction between the shaft and the sleeve and reduce the thermal off-track of magnetic heads resulting from variations in ambient temperature, and thereby improve further the reliability of the magnetic disk apparatus.

Although the present invention has been fully described by way of a preferred embodiment thereof with reference to the accompanying drawings, various changes and modifications will be apparent to those having skill in this field. Therefore, unless these changes and modifications otherwise depart from the scope of the present invention, they should be construed as included therein.

What is claimed is:

1. A magnetic head positioner for a magnetic disk apparatus, comprising:
    a shaft, mounted on an inner peripheral side of bearings, and comprising a material with a prescribed coefficient of linear expansion;
    a sleeve, mounted on an outer peripheral side of said bearings, and comprising a material with a different coefficient of linear expansion from that of said shaft;
    a magnetic head holder, mounted on an outer peripheral side of said sleeve, and provided with magnetic heads; and
    a correcting plate, interposed in a prescribed part of said sleeve, and comprising a material having a different coefficient of linear expansion from that of said shaft for compensating the difference in the coefficient of linear expansion between said shaft and said sleeve.

2. A magnetic head positioner for a magnetic disk apparatus as claimed in claim 1, wherein said sleeve is formed with a gap in a prescribed area at an outer peripheral side thereof for reducing contact areas between said sleeve and said magnetic head holder.

3. A magnetic head positioner for a magnetic disk apparatus as claimed in claim 1, wherein said correcting plate is cylindrical in shape.

4. A magnetic head positioner for a magnetic disk apparatus as claimed in claim 1, wherein said shaft comprises a stainless steel-based material, said sleeve comprises an aluminum-based material, and said correcting plate comprises AlTiC.

5. A magnetic head positioner for a magnetic disk apparatus as claimed in claim 1, wherein said shaft comprises a stainless steel-based material, said sleeve comprises an aluminum-based material, and said correcting plate comprises $Al_2O_3$.

* * * * *